United States Patent [19]

Moulton et al.

[11] Patent Number: 5,158,684
[45] Date of Patent: Oct. 27, 1992

[54] TRANSPORT AND DEPOSIT INHIBITION OF COPPER IN BOILERS

[75] Inventors: Roger D. Moulton, The Woodlands; Alexander C. McDonald, Kemah; James L. Soos, Conroe, all of Tex.

[73] Assignee: Betz Laboratories, Inc., Trevose

[21] Appl. No.: 667,849

[22] Filed: Mar. 12, 1991

[51] Int. Cl.⁵ .............................................. C02F 5/12
[52] U.S. Cl. ........................... 210/698; 134/22.19; 210/701; 252/82; 252/180; 422/16
[58] Field of Search .................... 134/3, 22.19; 210/698–701; 252/82, 180, 181; 422/16

[56] References Cited

U.S. PATENT DOCUMENTS

| | | | |
|---|---|---|---|
| 2,761,874 | 9/1956 | Bersworth et al. | 210/698 |
| 2,996,449 | 8/1961 | Hodge et al. | 210/698 |
| 3,507,795 | 4/1970 | Gardner | 252/87 |
| 3,730,901 | 5/1973 | Knox et al. | 210/698 |
| 4,028,239 | 6/1977 | Zinsstag et al. | 210/698 |
| 4,442,009 | 4/1984 | O'Leary et al. | 210/697 |
| 4,454,046 | 6/1984 | Wallace et al. | 210/698 |
| 4,457,847 | 7/1984 | Lorenc et al. | 210/698 |
| 4,657,785 | 4/1987 | Kelly et al. | 427/255.6 |
| 4,721,532 | 1/1988 | Kuhn et al. | 210/698 |
| 4,734,203 | 3/1988 | Lin et al. | 210/698 |
| 4,828,713 | 5/1989 | McDonald et al. | 210/697 |
| 4,867,945 | 9/1989 | Sherwood et al. | 422/16 |

Primary Examiner—Peter Hruskoci
Attorney, Agent, or Firm—Alexander D. Ricci; Philip H. Von Neida

[57] ABSTRACT

This invention relates to a method of transporting and inhibiting the deposition of copper and copper-iron materials on heat transfer devices in steam generating systems. This method utilizes a thermally stable chelant and a carboxylated polymeric dispersant as the treatment agents. Representative chemicals are 1,10-phenanthroline and 9:1 methacrylic acid/acrylic acid copolymer.

14 Claims, 5 Drawing Sheets

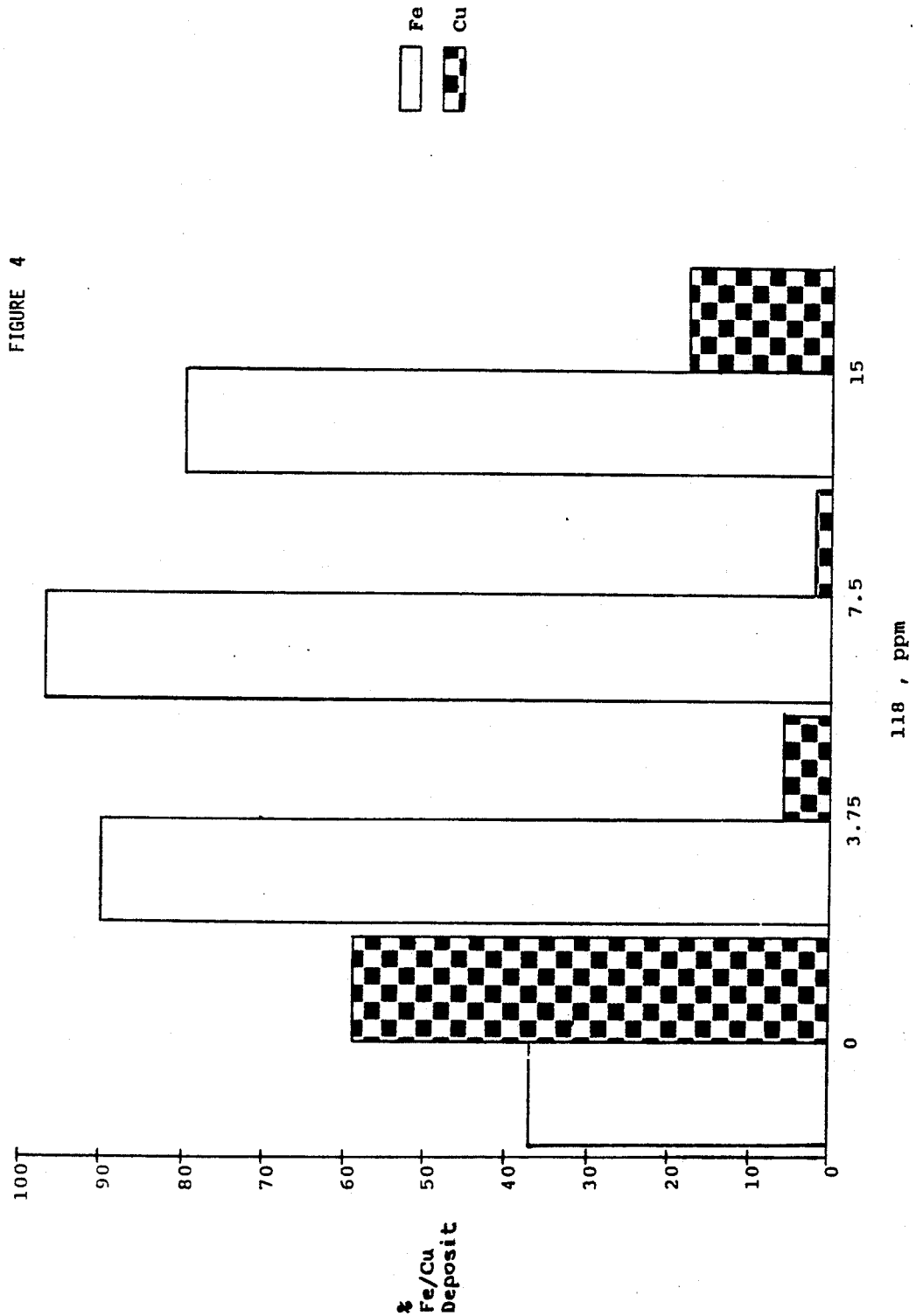

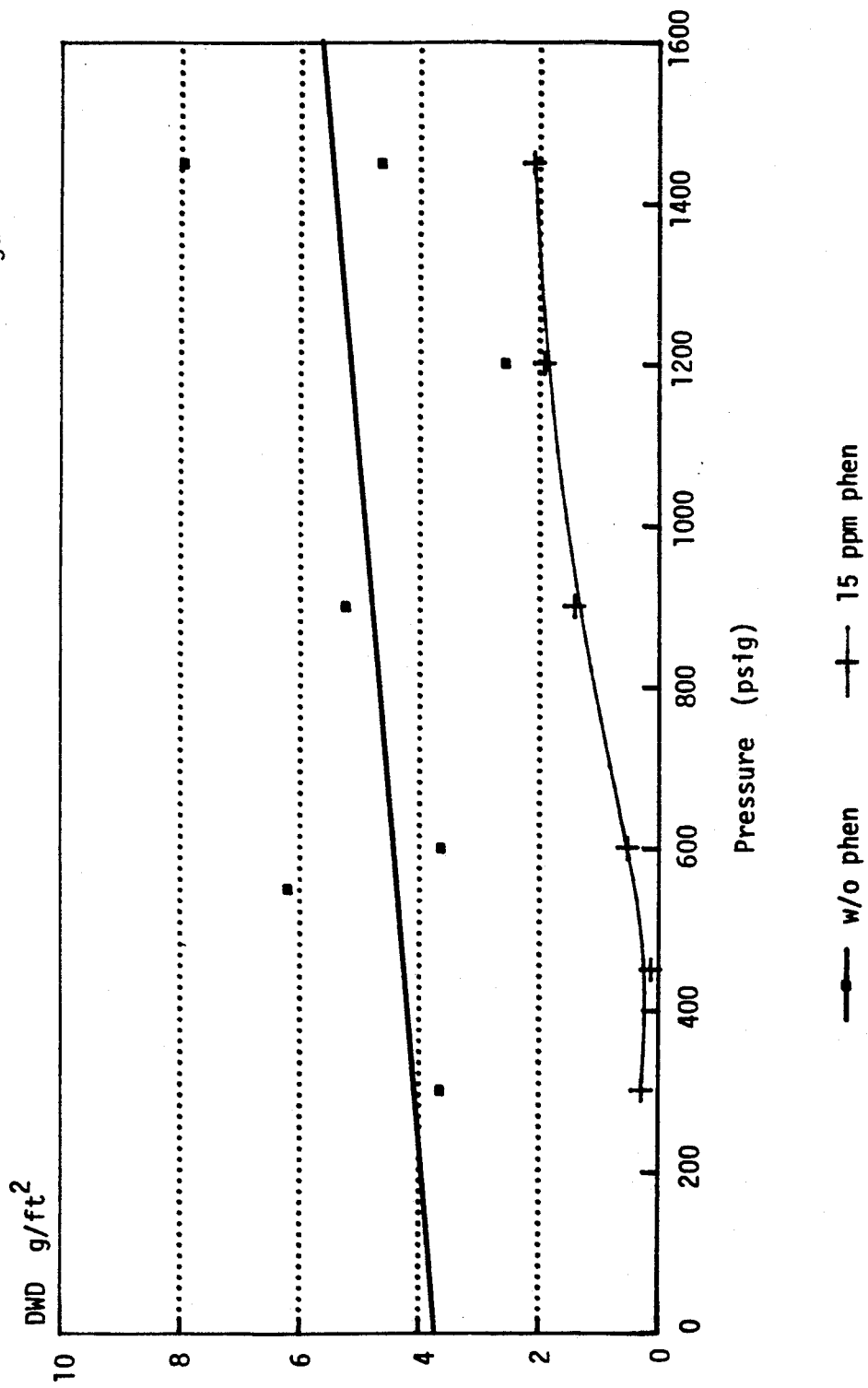

TRANSPORT AND DEPOSIT INHIBITION OF COPPER IN BOILERS

FIELD OF THE INVENTION

This invention relates to the use of thermally stable chelating molecules and dispersing carboxylated polymers to transport and inhibit deposition of copper and mixed copper-iron metals on heat transfer surfaces in steam generating systems.

BACKGROUND OF THE INVENTION

The corrosion, transport and deposition of copper and mixed copper-iron materials in steam generating systems is a major problem in industry today. These deposits can result in reduced reliability, damage to the systems, loss of effectiveness and increased costs due to cleaning, unscheduled outages and replacement of equipment.

Even under optimum boiler feedwater and condensate conditions, low dissolved oxygen, and controlled pH, copper oxides will be released as particulate oxides, soluble $Cu(I)/Cu(II)$ and metallic copper species. Copper oxides are relatively unstable and can dissolve, break-up and continually re-deposit within a boiler system.

Deposit control agents are often added to feedwaters of boilers. They act to control the deposition of copper in one of two ways: A solubilization mechanism, where chelants or chelant type molecules, form soluble complexes with the copper which are removed during blowdown; and, a dispersion mechanism, where the deposit control agent adsorbs on surfaces which blocks the adhesion of copper on heat transfer surfaces.

Polymer dispersants are used to disperse particulate matter or solid or colloidal matter already present. To some extent, polymers can also act as chelants to solubilize cations.

Chelants are the prime additives in a solubilizing boiler water treatment program. Chelants have the ability to complex and prevent the deposition of many cations (hardness and heavy metals) under boiler water conditions. They accomplish this by locking the metal into a soluble complex structure. When applied with a dispersant, chelants will result in clean waterside surfaces.

Historically, NTA (Nitrilo Triacetic Acid) and EDTA (Ethylenediaminetetraacetic Acid) were generally considered the most suitable boiler water treatment chelants.

GENERAL DESCRIPTION OF THE INVENTION

The present inventors have discovered a method of transporting and inhibiting the deposition of copper and mixed copper-iron materials on heat transfer surfaces in contact with an aqueous medium in steam generating systems comprising adding to said systems an effective amount for the purpose of a thermally stable chelant which is effective at complexing with the copper and mixed copper-iron materials.

The present inventors have further discovered that the use of both a thermally stable chelant and, in addition, a carboxylated polymeric dispersant is an effective method of transporting and inhibiting the deposition of copper and mixed copper-iron materials on heat transfer surfaces in contact with an aqueous medium in steam generating systems.

Exemplary thermally stable chelants under boiler conditions include 2-amino-3-hydroxypyridine (AHPD), 1,10-phenanthroline (PHEN), acetamidophenol (ACMPH), 1-cysteine, 1-asparagine, 1-histidine, -and 2-2-dipyridyl-.

Exemplary carboxylated polymeric dispersants include 9:1 methacrylic acid/acrylic acid copolymer. The present inventors anticipate that acrylic acid. methacrylic acid and maleic acid containing polymers and copolymers would also be useful in the present invention.

Accordingly, it is an object of the present invention to provide an effective method of transporting and inhibiting the deposition of copper and mixed copper-iron materials on heat transfer surfaces in steam generating systems.

Other and further objectives and advantages will be apparent from the specification.

DESCRIPTION OF THE RELATED ART

U.S. Pat. No. 4,734,203 (Lin et al.) discloses the use of (piperazine methyl-para-hydroxysulfonic acid)n and (piperazine methyl-para-hydroxybenzoic acid)n where n is from 2 to 20 to chelate and transport copper ions in boiler water. These compounds are copper selective chelating resins. The carboxylated version of these polymers was shown to be ineffective as a chelating agent compared to the polymers.

U.S. Pat. No. 4,828,713 (McDonald et al.) teaches the use of a methacrylic acid containing polymer and a nonionic surfactant to treat boiler waters. This treatment is designed to inhibit deposition on boiler surfaces and acts synergistically when used in conjunction with a chelant which increases the dispersant activity of the polymer. There is no suggestion in the McDonald patent that a combination of a chelant and a dispersing polymer would be effective in inhibiting the deposition and transporting copper in boiler systems.

U.S. Pat. No. 4,442,009 (O'Leary et al.) teaches the use of polymethacrylic acid acting as a dispersant with EDTA and a water soluble phosphate salt. This patent discloses a method of controlling scale in boiler water. The phosphate would form a precipitate with calcium ions which would be dispersed by the polymethacrylic acid. Nowhere does O'Leary teach the use of a chelant to control copper transport and deposition in boiler systems.

U.S. Pat. No. 4,657,785 (Kelly et al.) teaches the use of benzotriazole and/or tolyltriazole to reduce copper corrosion in boiler condensate systems. The triazole compound is used in conjunction with either neutralizing or film forming amines and is fed to the steam headers. The triazole compound complexes with the copper to form a film that acts as a corrosion barrier. This patent teaches a method of inhibiting copper corrosion. Nowhere in Kelly is it taught to complex copper and then transport the complex out of the boiler system.

U.S. Pat. No. 3,507,795 (Gardner) teaches the dissolution removal of copper and copper oxide scales from boilers using a water soluble, monobasic organic acid. The preferred embodiment teaches the use of acetic acid in a boiler cleaning solution system having a low (3.0 to 4.0) pH and is applied when the boiler is off-line. Nitrite and copper ions are also used in the aqueous solution to dissolve the copper bearing scale.

U.S. Pat. No. 4,867,945 (Sherwood et al.) teaches a method of inhibiting the corrosion of copper and copper alloys in aqueous systems using a polymer that contains in part 30 to 70 percent by weight acrylic acid or methacrylic acid. The other monomers making up the polymer are 2-acrylamido-2-methylpropylsulfonic acid or 2-methacrylamido-2-methylpropylsulfonic acid and acrylamide or methacrylamide. This patent does not teach the use of the polymers in the instant invention with the chelants found effective in the instant invention.

BRIEF DESCRIPTION OF THE DRAWINGS

The appended drawings graphically present the data generated by the examples which are reported below.

In the Drawings:

FIG. 4 is a bar graph showing the percent of iron and copper deposited versus ppm of 118 fed for AHPD tested in Table 2.

FIG. 5 is a graph showing the effect of temperature on deposit weight densities of copper with and without phenanthroline.

DETAILED DESCRIPTION OF THE INVENTION

Figure 1:
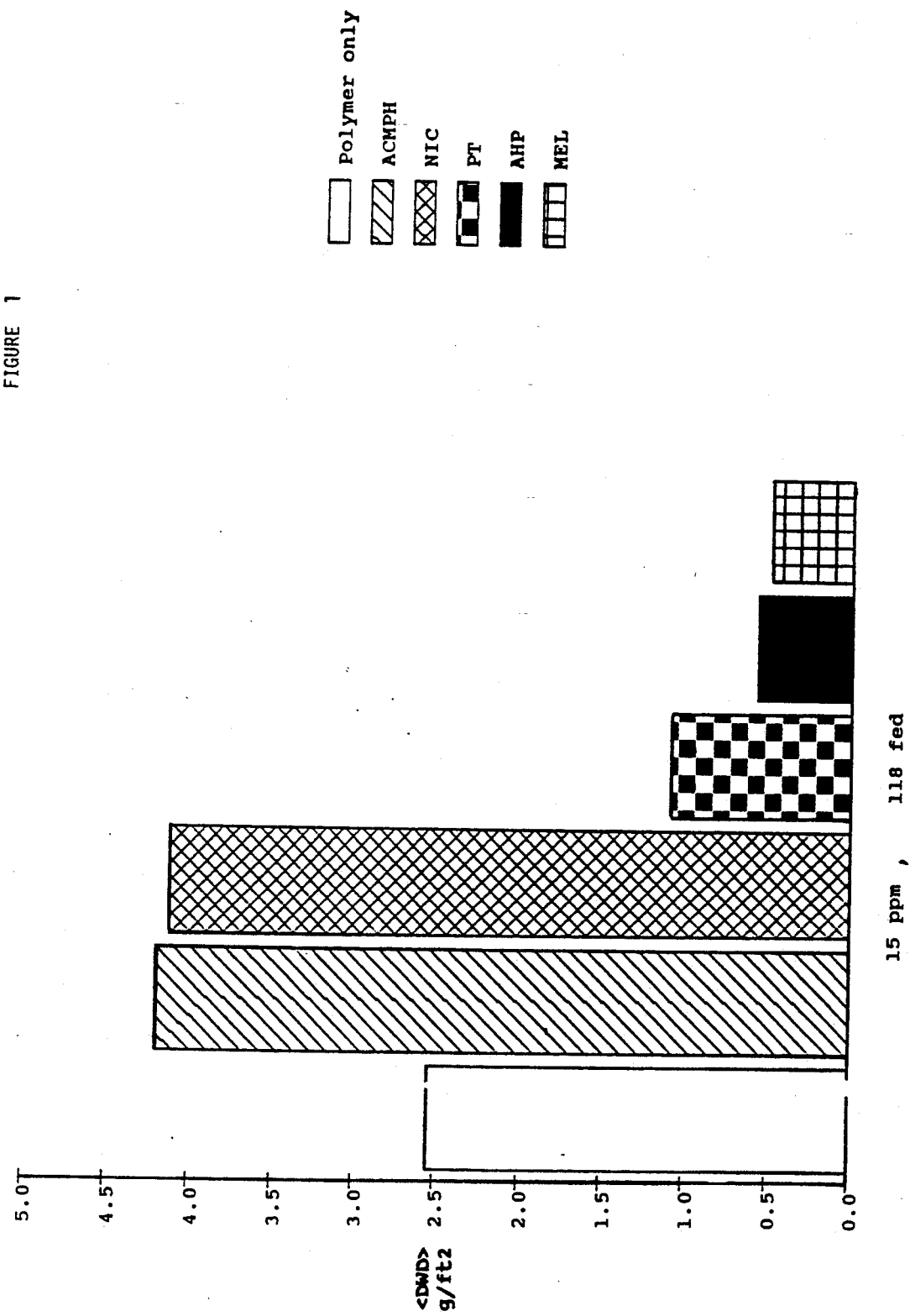
FIG. 1 is a bar graph showing the deposit weight density (DWD) versus 15 ppm 118 fed for various samples tested in Table 2. 118 is a methacrylic acid/acrylic acid copolymer.

The present inventors have discovered a method of transporting and inhibiting the deposition of copper and mixed copper-iron materials on heat transfer surfaces in contact with an aqueous medium in steam generating systems comprising adding an effective amount for the purpose of a thermally stable chelant which is effective at complexing with the copper and mixed copper-iron materials.

The present inventors have further discovered that the use of both a thermally stable chelant and, in addition, a carboxylated polymeric dispersant is an effective method of transporting and inhibiting the deposition of copper and mixed copper-iron materials on heat transfer surfaces in contact with an aqueous medium in steam generating systems.

Exemplary thermally stable chelants that are effective at complexing with the copper and mixed copper-iron materials under boiler with the copper and mixed copper-iron materials under boiler conditions include 2-amino-3-hydroxypyridine (AHPD), 1,10-phenanthroline (PHEN), 2,2-dipyridyl, acetadimidophenol (ACMPH), l-cysteine, l-asparagine, l-asparagine, l-histidine, and $N(CH_2CH_2NCH\ CO_2Na)_3$.

Exemplary carboxylated polymeric dispersants include 9:1 methacrylic acid/acrylic acid copolymer. The present inventors anticipate that acrylic acid, methacrylic acid and maleic acid containing polymers and copolymers would also be useful in the present invention.

CHELANTS

The thermally stable chelants that have been found effective in the present invention are those that form a complex with the copper species. This is the copper-chelant complex and may be either soluble or insoluble in the boiler water. Once formed, this complex may be removed from the boiler system during blowdown. The chelant is thermally stable in both the complexed and uncomplexed form. Thermally stable indicates that the chelant should be resistant to decomposition in the 600° F. plus temperatures often found in boilers and the copper/chelant complex should be resistant to hydrolysis and resistant to decomposition into copper oxide in its complexed form. An effective chelant will form a copper complex that is more difficult to reduce electrochemically to metallic copper. The chelant should be resistant to reacting with iron or iron oxides under boiler conditions and should not transport iron out of the system. Lastly, the chelant should reduce DWDs and increase copper in the boiler blowdown.

POLYMERIC DISPERSANTS

The polymers that have been found effective in the present invention are carboxylated polymers that act as dispersing agents. The main criteria for efficacy is that the functional groups of the dispersant form complexes or interact with the copper-chelant complex.

The polymer tested was commercially available 9:1 methacrylic acid/acrylic acid copolymer designated as 118. The present inventors anticipate that acrylic acid, methacrylic acid and maleic acid containing polymers and copolymers would also be useful in the present invention. The present inventors also anticipate that polymeric dispersants with functional sulfonate or phosphonate groups, such as sulfonated polystyrene or poly(isopropenyl phosphonic acid), are likely to be effective in that it is likely that these functional groups will form complexes or interact with the copper chelant complex.

Molecular weight is not critical to the invention, as long as the polymers are water soluble and contain functional groups that complex or interact with the copper-chelant complex. The molecular weight can be from 500 to 500,000. The commercially available polymers useful in this invention will have molecular weights that fall in this range.

After the addition of the thermally stable chelant ("chelant") and the formation of the copper-chelant complex, the carboxylated polymeric dispersant ("dispersant") is fed to the boiler water. The dispersant acts by way of at least two actions; first, the dispersant "stabilizes" the copper-chelant complex by coordinating to the copper metal center. It is thought that the role of the dispersant in stabilizing the copper-chelant complex to be by way of direct bonding between the functional group and the metal center. Alternatively, it is thought that the dispersant causes a general modification of the "Ligand Field" of the copper-chelant complex. According to the second means of action, the dispersant acts to disperse or otherwise inhibit from depositing on heat transfer surfaces the copper or mixed copper-iron materials which are subsequently removed during boiler blowdown.

The dispersant can be fed from about 1 to 1000 ppm active of boiler water. Chelant is fed from ½ to 100 stoichiometric ratio of predicted chelant to copper. Specific dosages are determined by the conditions existing in the particular boiler system. It is to be understood that the invention is not limited by the dosages of the chelant.

The present invention can be applied in a boiler water treatment program with other commonly used treatment agents. These can include but are not limited to: neutralizing or filming amines; oxygen scavengers; corrosion inhibitors; and the like.

The inventive method is best applied to the boiler water directly. This will save copper metallurgy which is often used in boiler feedwater systems.

The inventive treatment is not affected by the pH of the system, and will be effective at any boiler pH that is used in the industry.

The inventors have determined that the addition of the dispersant to the chelant enhances the chelant's ability to transport and inhibit the deposition of copper in steam generating systems. This combination is particularly effective in boilers operating in excess of 900 psig but is effective at pressures below this.

This invention will now be further described with respect to a number of specific examples which are to be regarded solely as illustrative, and not as restricting the scope of the invention.

EXPERIMENTAL

Shot Feed Experiments

The efficacy of selected compounds was screened by performing shot feed experiments in a research boiler. The boiler was operated at 15 cycles and 1000 psig pressure with 3 ppm Fe in the feedwater. After the boiler had attained steady state, 90 ppm of soluble copper salt and 400 ppm of the chelating compound were injected into the boiler water. In Table II, the chelant concentration was varied, but was at sufficient concentration so that all four coordination sites of the copper would be occupied by the chelant molecules. Blowdown samples were collected as a function of time after the shot feed and were analyzed for copper and iron levels transported out of the boiler. The blowdown samples in these experiments were obtained either from the top or the bottom of the research boiler, so the measured values represent copper and iron which are solubilized and/or dispersed in solution. The results of these shot feed experiments appear in Table I and II.

TABLE I

Blowdown Copper and Iron Collected From Top of Research Boiler Following 450 mg (90 ppm) Cu and 400 ppm Chelant Shot-fed: 1000 psig, 3 ppm Fe and Na/PO₄ Fed for pH Control

| Chelant | Total Metal Transported After 3 Blowdowns | |
|---|---|---|
| | Cu | Fe |
| —(AVG) | 0.71% | 0.58 mg |
| #110 | 0.21 | 0.93 |
| #118 | 1.48 | 0.73 |
| K-732 [Poly(acrylic acid)] | 1.43 | 0.45 |
| 93D Poly(methacrylic acid) commercially available polymer | 0.67 | 0.54 |
| EDTA | 0.10 | 9.75 |
| HEDTA - Hydroxyethylenediaminetetraacetic acid | 0.42 | 2.60 |
| Trimellitic acid | 0.85 | |
| Pyromelletic acid | 0.59 | 1.10 |
| Pyromellitic Diimide | 0.75 | 0.68 |
| 1,3-Phenylenediacetic Acid | 1.28 | 0.45 |
| 1,2-Phenylenediacetic Acid | 0.61 | 0.82 |
| Diaminocylohexane | 0.61 | 5.57 |
| Acetamidophenol | 2.43 | 1.16 |
| Pyrrolidinecarbodithiol | 1.85 | 0.53 |
| Pyrogallol | 1.04 | 0.77 |
| Catechol | 0.68 | 0.78 |
| Hydroquinone | 0.56 | 0.84 |
| Resorcinolmonoacetic Acid | 0.62 | 1.13 |
| Dipicolinic Acid | 0.31 | 0.59 |
| Nicotinic Acid | 1.87 | 0.90 |
| 2-Amino-3-Hydroxypyridine | 2.98 | 1.09 |
| 3-Aminopyridine | 1.07 | 1.51 |
| Melamine | 2.12 | 0.24 |
| 1,10-Phenanthroline | 4.27 | 0.63 |

TABLE I-continued

Blowdown Copper and Iron Collected From Top of Research Boiler Following 450 mg (90 ppm) Cu and 400 ppm Chelant Shot-fed: 1000 psig, 3 ppm Fe and Na/PO₄ Fed for pH Control

| Chelant | Total Metal Transported After 3 Blowdowns | |
|---|---|---|
| | Cu | Fe |
| 2,2-Dipyridyl | 1.68 | 1.07 |
| 4-Aminomorpholine | 0.97 | 0.89 |
| 4-Acetylmorpholine | 0.85 | 0.83 |
| Theoretical Maximum* | 42.0% | |

*assuming complete transport and 15 cycles operation
110 = Poly(isopropenylphosphonic acid)
118 = 9:1 methacrylic acid/acrylic acid copolymer
EDTA = ethylenediaminetetraacetic acid

TABLE II

Blowdown Copper and Iron Collected From Bottom of Research Boiler Following 450 mg Cu + Chelant Shot Feed 1450 psig, 3 ppm Fe and Na/PO4 Fed For pH Control

| Chelant | Total Metal Transported After 3 Blowdowns | | chelant fed |
|---|---|---|---|
| | Cu | Fe | |
| —(AVG) | 0.5% | 0.36 mg | 0 |
| 1,10 phenanthroline | 15.6 | 0.68 | 2.2 eq. |
| 1,10 phenanthroline | 34.6 | 0.18 | 3.3 eq. |
| 2,2'-dipyridyl | 20.3 | 3.49 | 3.1 eq. |
| 1,10 phen (+ melamine) | 11.7 | 0.24 | 2.2 eq. |
| phenanthroline (+ catechol and 15 ppm 118) | 19.0 | 4.60 | 2.2 eq. |
| phenanthroline (+ pyrogallol and 15 ppm 118) | 15.5 | 11.1 | 2.2 eq. |
| 1,10 phenanthroline (+ 15 ppm 118) | 14.8 | 0.65 | 2.2 eq. |
| l-serine | 0.7 | 0.44 | 2.2 eq. |
| l-asparagine | 3.7 | 0.71 | 2.2 eq. |
| l-arginine | 0.7 | 0.17 | 2.2 eq. |
| l-cysteine | 6.9 | 1.28 | 2.2 eq. |
| l-histidine | 4.1 | 5.85 | 2.2 eq. |
| 2-amino-3-hydroxypyridine | 5.0 | 2.13 | 2.2 eq. |
| Example 1 | 1.8 | 0.40 | 1.1 eq. |
| ethanolamine | 6.2 | 9.54 | 2.2 eq. |
| triethanolamine | 7.0 | 7.40 | 6.6 eq. |
| theoretical maximum possible* | 42.0 | | |

*assuming complete transport and 15 cycles operation

I. N(CH₂CH₂ NCH COONa)₃

Example 1 is a Type I molecule.

Some of the compounds which exhibited the most effectiveness in chelating and transporting copper out of the boiler via blowdown under conditions of the shot feed test were acetamidophenol (ACMPH), 2-amino-3-hydroxypyridine (AHPD), 1,10-phenanthroline (PHEN), 2,2-Dipyridyl, melamine (MEL), nicotinic acid (NIC), l-cysteine, l-asparagine, and l-histidine. Their results are shown in Tables I and II.

The remaining compounds tested showed no significant ability to transport copper out of the boiler. Most notably ineffective were EDTA, HEDTA, poly(methacrylic acid), 9:1 methacrylic acid/acrylic acid copolymer, poly (acrylic acid), and poly (isopropenylphosphonic acid).

The results of Table I show that EDTA and HEDTA were good at transporting iron out of the boiler but poor at transporting copper out of the boiler system. Since iron transport is caused by corrosion in boilers and poor copper transport results in copper deposit, EDTA and HEDTA were rejected as chelating agents.

Tables I and II also represent the iron concentration in the blowdown samples after 3 blowdowns. The chelants added in the shot feed do not increase the iron concentrations significantly. This illustrates that the chelants are unlikely to cause leaching of iron from the protective magnetite surfaces on the interior surfaces of a boiler.

Research Boiler Runs

Research boilers were fired with electric heated probes at a heat flux of 376 w/in$^2$. The boilers were operated for 44 hours in duration and the steaming and blowdown rates were maintained at constant rates to achieve the required number of cycles of operation.

Deposit weight density (DWD) was used as the primary indicator of product effectiveness. Blowdown compositions (pH, conductivity and copper/iron concentrations) were used as the indicators of correct research boiler function. DWDS were determined analytically by removing the deposit from the heated probes by soaking in an HCl solution and then scraped mechanically.

The chelants which exhibited activity to transport copper in the shot feed experiments were evaluated in conjunction with 118 (9:1 methacrylic acid/acrylic acid copolymer) in a research boiler experiment. Pressure was kept at 1450 psig for 15 cycles in a coordinated phosphate/pH program (PPH). Feedwater consisted of 3 ppm Fe and 6 ppm Cu. The thermally stable chelant being tested was fed substoichiometricaly of copper "demand" based on the predicted complex formation. Thermally stable means the compound resists thermal decomposition in the 600° F. plus temperatures often found in boilers. Specific dosages of dispersant and chelant are determined by the conditions existing in the particular boiler system. It is to be understood that our invention is not limited by the dosage of the chelant.

The results of these boiler tests are presented in Tables III A&B, IV A&B and V.

TABLE III-A 118 and experimental copper chelants at 1450 psig, ppH program (3 ppm Fe, 6 ppm Cu) feedwater at 15 cycles.

| Run No. | 118 Feed ppm | Chelant | Chelant Demand | DWD g/ft$^2$ | Cu g/ft$^2$ | Cu % |
|---|---|---|---|---|---|---|
| 1 | 0.0 | | 0.00 | 5.18 | 0.32 | 6 |
| 2 | 0.0 | | 0.00 | 1.38 | 0.39 | 28 |
| 3 | 0.0 | | 0.00 | 1.82 | 0.46 | 25 |
| 4 | 0.0 | | 0.00 | 4.65 | 2.41 | 52 |
| 5 | 7.5 | | 0.00 | 0.88 | 0.51 | 58 |
| 6 | 15.0 | | 0.00 | 1.65 | 0.75 | 45 |
| 7 | 15.0 | | 0.00 | 2.87 | 1.50 | 52 |
| 8 | 15.0 | | 0.09 | 3.10 | 1.35 | 44 |
| 9 | 7.5 | ACMPH | 1.00 | 2.46 | 1.56 | 63 |
| 10 | 15.0 | ACMPH | 1.00 | 4.20 | 2.13 | 51 |
| 11 | 0.0 | AHPD | 1.00 | 2.14 | 1.31 | 61 |
| 12(?) | 0.0 | AHPD | 1.00 | 5.35 | 3.06 | 57 |
| 13 | 3.7 | AHPD | 1.00 | 0.71 | 0.05 | 6 |
| 14 | 3.7 | AHPD | 0.75 | 2.42 | 1.06 | 44 |
| 15 | 3.7 | AHPD | 0.50 | 1.10 | 0.40 | 36 |
| 16 | 7.5 | AHPD | 1.00 | 0.53 | 0.01 | 2 |
| 17(*) | 7.5 | AHPD | 1.00 | 0.54 | 0.02 | 3 |
| 18 | 15.0 | AHPD | 1.00 | 0.58 | 0.10 | 18 |
| 19 | 0.0 | MEL | 1.00 | 5.01 | 4.03 | 80 |
| 20 | 3.7 | MEL | 1.00 | 0.49 | 0.23 | 48 |
| 21 | 3.7 | MEL | 0.75 | 7.74 | 6.91 | 89 |
| 22 | 3.7 | MEL | 0.50 | 6.53 | 5.67 | 87 |
| 23 | 15.0 | NIC | 1.00 | 4.12 | 1.64 | 40 |
| 24 | 0.0 | PHEN | 1.00 | 1.56 | 0.88 | 56 |
| 25 | 3.7 | PHEN | 1.00 | 2.48 | 1.91 | 77 |

TABLE III-A-continued 118 and experimental copper chelants at 1450 psig, ppH program (3 ppm Fe, 6 ppm Cu) feedwater at 15 cycles.

| Run No. | 118 Feed ppm | Chelant | Chelant Demand | DWD g/ft$^2$ | Cu g/ft$^2$ | Cu % |
|---|---|---|---|---|---|---|
| 26 | 15.0 | PHEN | 1.00 | 1.09 | 0.34 | 31 |

*1.5 ppm of N-101 added
?feedwater pump malfunction, results may not be representative

TABLE III-B 118 and experimental copper chelants at 1450 psig, ppH program (3 ppm Fe, 6 ppm Cu) feedwater at 15 cycles same feed conditions as in Table IIA

| Run No. | Fe g/ft$^2$ | Fe % | PO$_4$ g/ft$^2$ | SiO$_2$ g/ft$^2$ | TH g/ft$^2$ |
|---|---|---|---|---|---|
| 1 | 1.80 | 35 | 1.30 | 0.32 | 1.77 |
| 2 | 0.95 | 69 | 0.02 | 0.39 | 0.00 |
| 3 | 0.89 | 49 | 0.24 | 0.46 | 0.21 |
| 4 | 2.17 | 47 | 0.02 | 0.00 | 0.03 |
| 5 | 0.35 | 40 | 0.00 | 0.51 | 0.00 |
| 6 | 0.86 | 52 | 0.02 | 0.75 | 0.00 |
| 7 | 1.31 | 46 | 0.03 | 1.50 | 0.02 |
| 8 | 1.72 | 56 | 0.01 | 0.00 | 0.01 |
| 9 | 0.84 | 34 | 0.04 | 0.01 | 0.03 |
| 10 | 1.77 | 42 | 0.17 | 0.01 | 0.12 |
| 11 | 0.80 | 37 | 0.02 | 0.00 | 0.01 |
| 12(?) | 2.00 | 37 | 0.14 | 0.01 | 0.15 |
| 13 | 0.63 | 90 | 0.01 | 0.00 | 0.02 |
| 14 | 1.30 | 54 | 0.02 | 0.00 | 0.03 |
| 15 | 0.68 | 62 | 0.01 | 0.00 | 0.01 |
| 16 | 0.52 | 97 | 0.00 | 0.00 | 0.01 |
| 17(*) | 0.51 | 94 | 0.01 | 0.00 | 0.01 |
| 18 | 0.46 | 80 | 0.01 | 0.00 | 0.00 |
| 19 | 0.95 | 19 | 0.02 | 0.00 | 0.01 |
| 20 | 0.24 | 49 | 0.00 | 0.00 | 0.01 |
| 21 | 0.78 | 10 | 0.03 | 0.00 | 0.01 |
| 22 | 0.82 | 13 | 0.02 | 0.00 | 0.01 |
| 23 | 2.23 | 54 | 0.21 | 0.00 | 0.04 |
| 24 | 0.66 | 42 | 0.01 | 0.00 | 0.01 |
| 25 | 0.55 | 22 | 0.01 | 0.00 | 0.01 |
| 26 | 0.69 | 64 | 0.03 | 0.00 | 0.03 |

*1.5 ppm of N-101 added
?Feedwater Pump malfunction, results may not be representative

TABLE III A & B

118 = 9:1 methacrylic acid/acrylic acid copolymer
DWD = Deposit weight density
TH = Total Hardness
ACMPH = Acetamidophenol
AHPD = 2-amino-3-hydroxypyridine
MEL = Melamine
NIC = Nicotinic acid
PHEN = 1,10-phenanthroline
N-101 = Triton N101 surfactant available from Rohm & Haas

TABLE IV-A 118 and experimental copper chelants at 1450 psig, ppH program (3 ppm Fe, 6 ppm Cu) feedwater at 15 cycles.

| Run No. | 118 Feed ppm | Chelant | Chelant Demand | DWD g/ft$^2$ | Cu ppm |
|---|---|---|---|---|---|
| 1 | 0.0 | | 0.00 | 5.18 | 0.00 |
| 2 | 0.0 | | 0.00 | 1.38 | 0.00 |
| 3 | 0.0 | | 0.00 | 1.82 | 2.50 |
| 4 | 0.0 | | 0.00 | 4.65 | 0.47 |
| 5 | 7.5 | | 0.00 | 0.88 | 0.13 |
| 6 | 15.0 | | 0.00 | 1.65 | 0.00 |
| 7 | 15.0 | | 0.00 | 2.87 | 0.00 |
| 8 | 15.0 | | 0.00 | 3.10 | 1.00 |
| 9 | 7.5 | ACMPH | 1.00 | 2.46 | 0.18 |
| 10 | 15.0 | ACMPH | 1.00 | 4.20 | 0.40 |
| 11 | 0.0 | AHPD | 1.00 | 2.14 | 0.27 |
| 12(?) | 0.0 | AHPD | 1.00 | 5.35 | — |
| 13 | 3.7 | AHPD | 1.00 | 0.71 | 0.34 |
| 14 | 3.7 | AHPD | 0.75 | 2.42 | 0.52 |

TABLE IV-A-continued 118 and experimental copper chelants at 1450 psig, ppH program (3 ppm Fe, 6 ppm Cu) feedwater at 15 cycles.

| Run No. | 118 Feed ppm | Chelant | Chelant Demand | DWD g/ft$^2$ | Cu ppm |
|---|---|---|---|---|---|
| 15 | 3.7 | AHPD | 0.50 | 1.10 | — |
| 16 | 7.5 | AHPD | 1.00 | 0.53 | 0.22 |
| 17(*) | 7.5 | AHPD | 1.00 | 0.54 | 0.28 |
| 18 | 15.0 | AHPD | 1.00 | 0.58 | 0.18 |
| 19 | 0.0 | MEL | 1.00 | 5.01 | 0.17 |
| 20 | 3.7 | MEL | 1.00 | 0.49 | 0.29 |
| 21 | 3.7 | MEL | 0.75 | 7.74 | 5.90 |
| 22 | 3.7 | MEL | 0.50 | 6.53 | 0.27 |
| 23 | 15.0 | NIC | 1.00 | 4.12 | 0.47 |
| 24 | 0.0 | PHEN | 1.00 | 1.56 | 4.40 |
| 25 | 3.7 | PHEN | 1.00 | 2.48 | 7.60 |
| 26 | 15.0 | PHEN | 1.00 | 1.09 | 2.00 |

*1.5 ppm of N-101 added
?feedwater pump malfunction, results not representative

TABLE IV-B 118 and experimental copper chelants at 1450 psig, ppH program (3 ppm Fe, 6 ppm Cu) feedwater at 15 cycles. Same feed conditions as in Table IIIA

| Run No. | BLD pH | BLD uS | BLD Turb | TH ppm | Fe ppm | PO$_4$ ppm | SiO$_2$ ppm |
|---|---|---|---|---|---|---|---|
| 1 | 6.23 | 478 | 2.00 | 10.00 | 0.54 | — | 7.90 |
| 2 | 10.53 | 904 | 0.00 | 1.3 | 0.00 | 25.0 | 0.00 |
| 3 | 4.30 | 810 | 3.00 | 22.6 | 2.80 | 20.0 | 2.50 |
| 4 | 11.35 | 1309 | 5.50 | 0.00 | 0.07 | 24.0 | 6.30 |
| 5 | 11.36 | 1684 | 1.00 | 0.00 | 0.20 | 23.0 | 6.60 |
| 6 | 10.58 | 879 | 0.00 | 0.70 | 0.14 | — | 5.10 |
| 7 | 10.67 | 875 | 1.00 | 0.00 | 0.06 | 16.2 | 5.40 |
| 8 | 10.85 | 1084 | 51.9 | 0.00 | 0.00 | 27.0 | 7.00 |
| 9 | 10.31 | 900 | 3.10 | 0.00 | 0.35 | 28.0 | 5.50 |
| 10 | 7.76 | 964 | 15.0 | 0.00 | 0.54 | 25.0 | 5.70 |
| 11 | 10.21 | 1030 | 0.10 | 0.00 | 0.07 | 27.0 | 5.10 |
| 12(?) | 9.05 | 870 | 0.70 | 15.00 | 0.13 | 28.0 | 4.20 |
| 13 | 9.54 | 925 | 0.07 | 4.20 | 0.10 | 24.0 | 4.30 |
| 14 | 5.50 | 811 | 0.09 | 0.00 | 0.00 | 19.1 | 3.80 |
| 15 | 10.07 | 930 | 0.08 | — | — | — | — |
| 16 | 10.86 | 1512 | 3.60 | 0.00 | 0.15 | 39.0 | 5.00 |
| 17(*) | 10.86 | 1512 | 3.60 | 0.00 | 0.15 | 37.0 | 7.50 |
| 18 | 7.48 | 872 | 35.1 | 0.00 | 0.85 | 33.0 | 5.40 |

TABLE IV-B-continued 118 and experimental copper chelants at 1450 psig, ppH program (3 ppm Fe, 6 ppm Cu) feedwater at 15 cycles. Same feed conditions as in Table IIIA

| Run No. | BLD pH | BLD uS | BLD Turb | TH ppm | Fe ppm | PO$_4$ ppm | SiO$_2$ ppm |
|---|---|---|---|---|---|---|---|
| 19 | 11.09 | 1303 | 0.50 | 0.00 | 0.00 | 25.0 | 6.20 |
| 20 | 10.65 | 1166 | 0.80 | — | 0.14 | — | — |
| 21 | 11.13 | 1262 | 0.50 | 2.10 | 0.24 | 24.0 | 6.20 |
| 22 | 11.11 | 1214 | 0.90 | 3.60 | 0.27 | 24.0 | 5.10 |
| 23 | 7.20 | 992 | 3.20 | 7.10 | 0.90 | 1.1 | 8.30 |
| 24 | 10.89 | 959 | 0.90 | 0.84 | 0.90 | 20.0 | 5.00 |
| 25 | 11.16 | 1270 | 0.90 | 0.96 | 0.13 | 25.0 | 5.90 |
| 26 | 10.95 | 885 | 0.90 | 0.00 | 0.22 | 17.0 | 6.10 |

*1.5 ppm N-101 added
?Feedwater pump malfunction, results not representative.

TABLE IV A&B

118 = 9:1 methacrylic acid/acrylic acid copolymer
DWD = Deposit weight density
TH = Total Hardness
ACMPH = Acetamidophenol
AHPD = 2-amino-3-hydroxypyridine
MEL = Melamine
NIC = Nicotinic acid
PHEN = 1,10-phenanthroline
N-101 = Triton N101 surfactant available from Rohm & Haas
BLD = Blowdown In Tables IV A&B, the research boiler experiments were run at 300 to 1450 psig and the chelants were fed at 1.1 to 8.8 molar demand based on copper feed of 90 ppm. Blowdown samples were allowed to evaporate to dryness prior to analysis.

TABLE V

| Chelant | Demand ppm | P psig | DWD g/ft2 | Cu g/ft2 | Fe g/ft2 | PO4 g/ft2 | SiO2 g/ft2 | BLD ppm Fe | BLD ppm Cu |
|---|---|---|---|---|---|---|---|---|---|
| blank | 0 | 1450 | 4.65 | 2.41 | 2.17 | 0.02 | 0.00 | 0.07 | 0.47 |
| blank | 0 | 1450 | 7.96 | 6.86 | 1.05 | 0.03 | 0.01 | 0.11 | 0.62 |
| blank | 0 | 1200 | 2.56 | 1.40 | 1.15 | 0.01 | 0.00 | 0.00 | 0.36 |
| blank | 0 | 900 | 5.25 | 4.08 | 1.15 | 0.01 | 0.01 | 0.00 | 0.11 |
| blank | 0 | 600 | 3.63 | 2.43 | 1.17 | 0.02 | 0.00 | 0.06 | 0.85 |
| blank | 0 | 550 | 6.20 | 4.96 | 1.21 | 0.02 | 0.01 | 0.10 | 0.63 |
| blank | 0 | 300 | 3.64 | 2.13 | 1.49 | 0.01 | 0.00 | 1.5 | 0.33 |
| 118 | 15 | 1450 | 2.87 | 1.50 | 1.31 | 0.03 | 0.00 | 0.10 | 0.00 |
| 118 | 15 | 1450 | 3.10 | 1.35 | 1.72 | 0.01 | 0.00 | 0.00 | 1.00 |
| phenanthroline | 15 | 1450 | 2.10 | 0.69 | 1.36 | 0.02 | 0.00 | 0.13 | 0.35 |
| phenanthroline | 15 | 1200 | 1.93 | 1.08 | 0.83 | 0.01 | 0.00 | 0.22 | 5.0 |
| phenanthroline | 15 | 900 | 1.43 | 0.49 | 0.93 | 0.00 | 0.00 | 0.00 | 2.8 |
| phenanthroline | 15 | 600 | 0.53 | 0.09 | 0.43 | 0.00 | 0.00 | 0.07 | 4.2 |
| phenanthroline | 15 | 450 | 0.14 | 0.02 | 0.11 | 0.00 | 0.00 | 0.44 | 8.9 |
| phenanthroline | 15 | 300 | 0.29 | 0.08 | 0.21 | 0.00 | 0.00 | 0.14 | 5.7 |
| phenanthroline | 30 | 1450 | 0.14 | 0.02 | 0.12 | 0.00 | 0.00 | 0.49 | 7.3 |
| phenanthroline | 60 | 1450 | 6.87 | 5.66 | 1.17 | 0.03 | 0.00 | 0.58 | 5.5 |
| 1:1 phen + 118 | 15 | 900 | 0.50 | 0.20 | 0.30 | 0.00 | 0.00 | 0.10 | 3.7 |
| 1:2 phen + 118 | 15 | 900 | 0.40 | 0.11 | 0.28 | 0.00 | 0.00 | 0.11 | 5.5 |
| acetamidophenol | 15 | 900 | 4.13 | 2.32 | 1.80 | 0.05 | 0.00 | 0.38 | 0.55 |
| acetamidophenol | 15 | 1200 | 7.35 | 4.16 | 3.08 | 0.06 | 0.01 | 0.27 | 0.31 |
| acetamidophenol | 15 | 1450 | 2.57 | 0.81 | 1.71 | 0.02 | 0.00 | 0.13 | 0.35 |
| acetamidophenol | 30 | 1450 | 0.48 | 0.15 | 0.33 | 0.00 | 0.00 | 1.7 | 1.4 |
| aminohydroxypyridine | 15 | 1450 | 1.66 | 0.57 | 1.06 | 0.01 | 0.00 | 0.08 | 0.48 |
| l-cysteine | 15 | 1450 | 6.69 | 5.22 | 1.35 | 0.06 | 0.02 | 0.20 | 1.8 |
| l-asparagine | 15 | 1450 | 6.23 | 4.38 | 1.73 | 0.10 | 0.01 | 0.12 | 0.19 |
| l-asparagine | 30 | 1450 | 7.08 | 5.51 | 1.52 | 0.03 | 0.01 | 0.00 | 0.06 |
| 1458-272 | 9.2 | 1450 | 0.42 | 0.17 | 0.24 | 0.00 | 0.00 | 7.5 | 10.5 |

When tested by itself and not in combination, 118 is not effective in transporting and inhibiting the deposition of copper under the test conditions. Effective deposit inhibition was observed when the dispersant and the chelant were used in combination, or if excess chelant was used.

Figure 2:
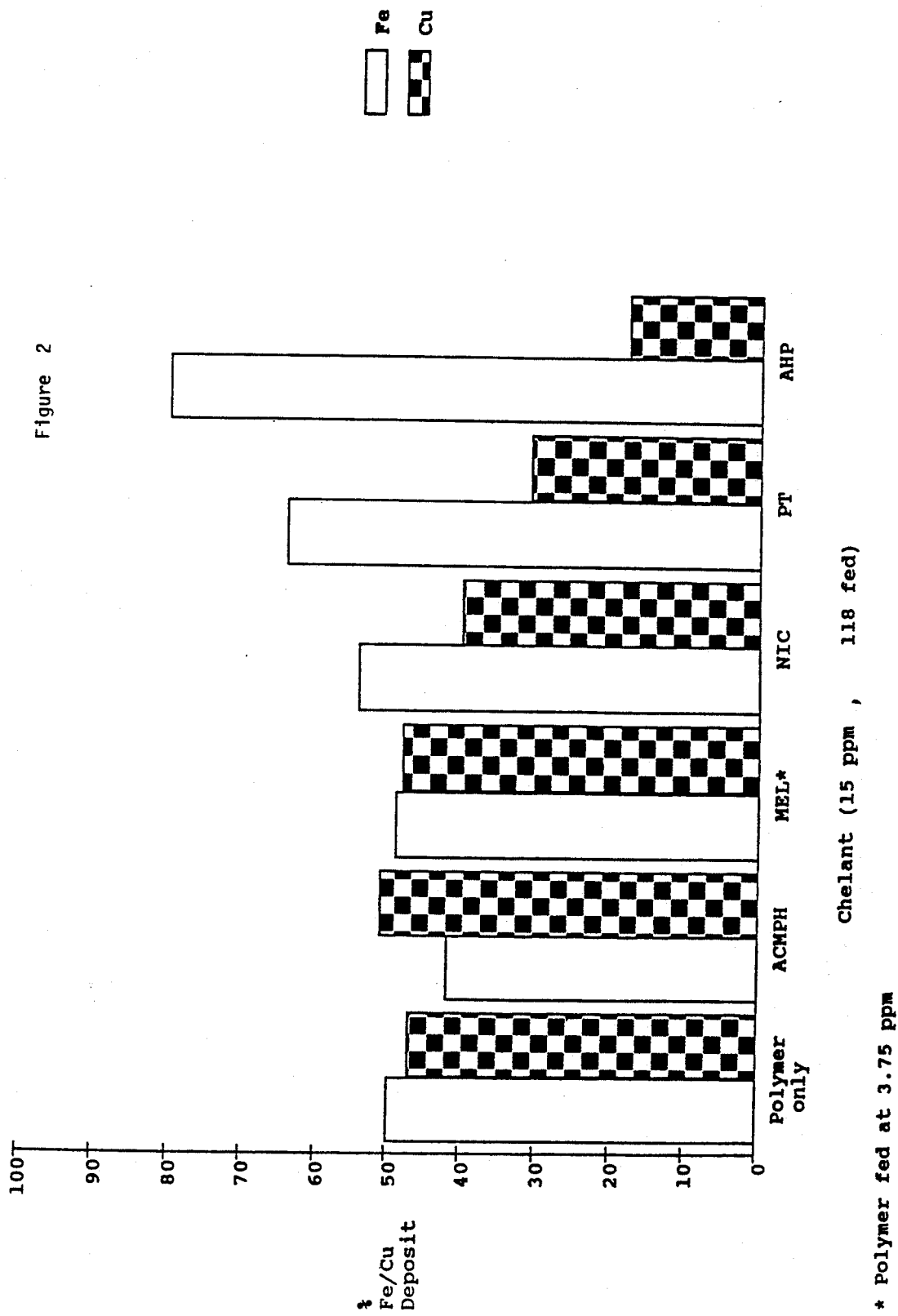
FIG. 2 is a bar graph showing the percent of iron and copper deposited versus 15 ppm 118 fed for various samples tested in Table 2.
Figure 3:
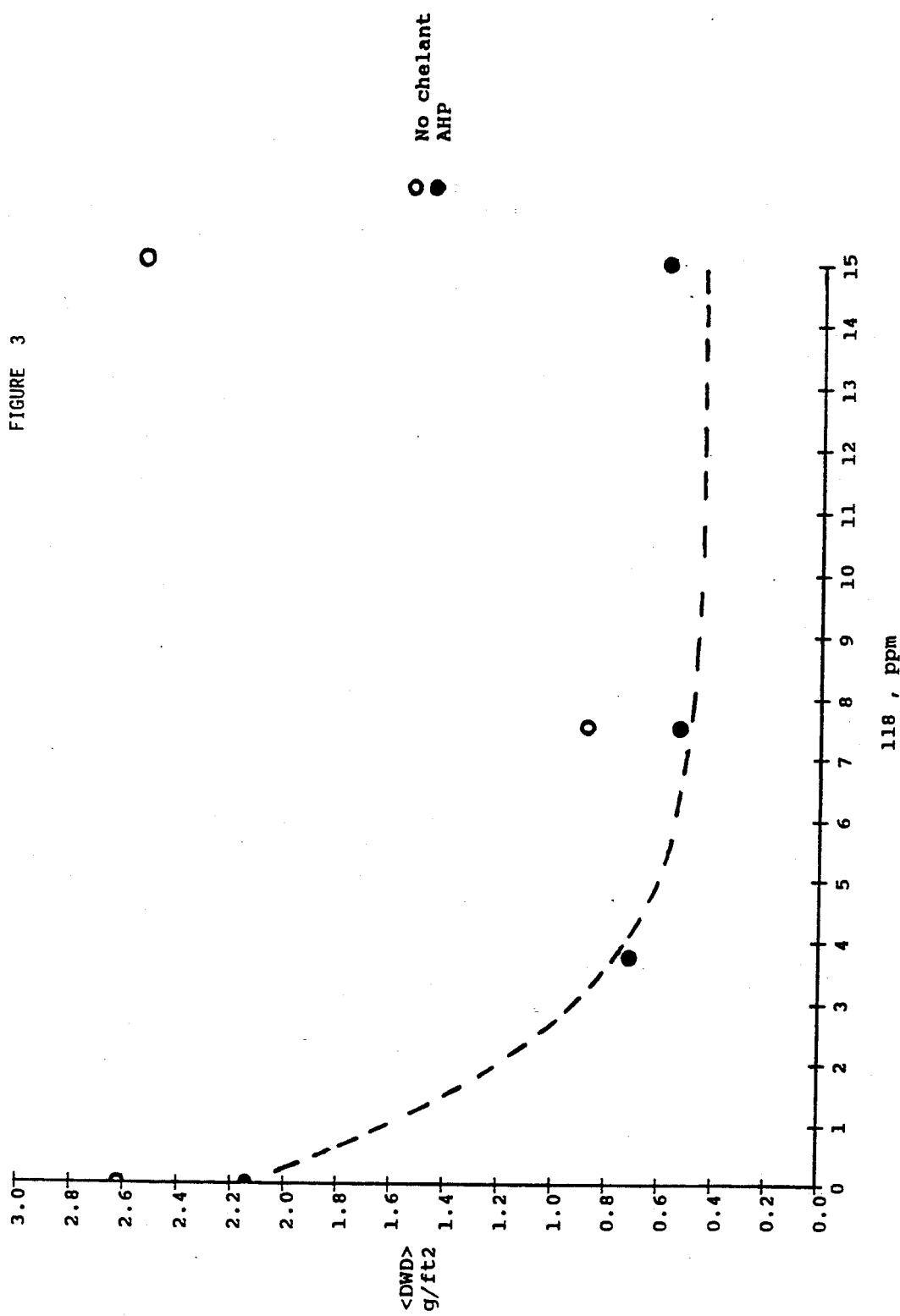
FIG. 3 is a graph showing the deposit weight density versus ppm fed of 118 for AHPD tested in Table 2.

As indicated in FIGS. 1 to 4, PHEN and AHPD all exhibited good deposit inhibition under test conditions.

A low DWD indicates effective dispersion. At 15 ppm 118 feed, PHEN and AHPD both exhibited better deposit inhibition than the polymer or chelant used alone. However, MEL increased deposit of copper when compared with the polymer or chelant alone.

As seen in FIG. 4, feeding both 118 and AHPD resulted in deposits that are predominantly iron with only 2 to 18 weight percent copper present. ACMPH and NIC were both ineffective as chelants and may have actually increased deposition versus the feed of the polymer itself.

In FIG. 5, the effect of feeding phenanthroline on measured DWD values as a function of pressure is indicated. Whereas phenanthroline shows significant effectiveness at 1450 psig, it becomes markedly more effective at lower pressures.

Good copper deposit inhibition can be achieved using effective amounts of the thermally stable under boiler conditions chelants. It can be also seen that a combination of a thermally stable chelant and a carboxylated polymeric dispersant is efficacious at transporting and inhibiting the deposition of copper and mixed copper-iron materials on heat transfer surfaces in contact with an aqueous medium in steam generating systems.

In accordance with the patent statutes, the best mode of practicing the invention has been herein set forth. However, it will be apparent to those skilled in the art that many modifications can be made in the method herein disclosed without departing from the spirit of the invention.

Having described the invention what we claim is:

1. A method of transporting and inhibiting the deposition of copper and mixed copper-iron materials on heat transfer surfaces in contact with an aqueous medium in steam generating systems comprising adding an effective amount for the purpose of a thermally stable chelant selected from the group consisting of 2-amino-3-hydroxypyridine, 1,10-phenanthroline, 2,2-dipyridyl, 1-cysteine, 1-asparagine, 1-histidine, and acetamidophenol which is effective at complexing with said copper and mixed copper-iron materials.

2. A method as described in claim 1 wherein said chelant can be fed directly to said steam generating system.

3. A method as described in claim 1 wherein said chelant can be fed to said steam generating systems in an amount substoichiometric to the amount required to react with said copper present.

4. A method as described in claim 1 wherein said steam generating system is a boiler system.

5. A method as described in claim 4 wherein said boiler system operates at a pressure greater than 900 psig.

6. A method of transporting and inhibiting the deposition of copper and mixed copper-iron materials on heat transfer surfaces in contact with an aqueous medium in steam generating systems comprising adding a thermally stable chelant selected from the group consisting of 2-amino-3-hydroxypyridine, 1, 10-phenanthroline, 2,2'-dipyridyl, 1-cysteine, 1-asparagine, 1-histidine, and acetamidophenol, wherein the chelant is added ½ to 100 times the stoichiometric ratio of chelant to copper in said aqueous medium, and from about 1 part per million to about 1000 parts per million a carboxylated polymeric dispersant.

7. A method as described in claim 6 wherein said carboxylated polymeric dispersant is a methacrylic acid/acrylic acid copolymer.

8. A method as described in claim 6 wherein said carboxylated polymeric dispersant is poly(acrylic acid).

9. A method as described in claim 6 wherein said carboxylated polymeric dispersant is poly(methacrylic acid).

10. A method as described in claim 6 wherein said carboxylated polymeric dispersant is poly(maleic acid).

11. A method as described in claim 6 wherein said chelant and said carboxylated polymeric dispersant can be fed directly to said steam generating systems.

12. A method as described in claim 6 wherein said chelant can be fed to said steam generating systems in an amount substoichiometric to the amount required to react with said copper present.

13. A method as described in claim 6 wherein said steam generating system is a boiler system.

14. A method as described in claim 13 wherein said boiler system operates at a pressure greater than 900 psig.

* * * * *